United States Patent [19]

Michael

[11] 4,376,444
[45] Mar. 15, 1983

[54] VACUUM OPERATED CHECK VALVE FOR VACUUM CONDUITS

[75] Inventor: Harald Michael, Hamburg, Fed. Rep. of Germany

[73] Assignee: Electrolux GmbH, Fed. Rep. of Germany

[21] Appl. No.: 70,531

[22] Filed: Aug. 28, 1979

[51] Int. Cl.³ .................. F17D 3/00; F16K 31/126
[52] U.S. Cl. ................... 137/1; 137/DIG. 8; 251/50; 251/61.2; 251/61.1; 251/331; 251/335 A; 251/25
[58] Field of Search .............. 251/25, 28, 43, 44, 251/45, 46, 61.1, 61.2, 335 B, 335 A, 48, 37, 63.6, 50, 282, 331; 137/1, DIG. 8, 488

[56] References Cited

U.S. PATENT DOCUMENTS

| | | | |
|---|---|---|---|
| 1,347,192 | 7/1920 | Tygard et al. | 251/25 |
| 1,964,921 | 7/1934 | Lundberg | 251/37 |
| 2,199,549 | 5/1940 | Saunders | 251/63.6 |
| 2,558,652 | 6/1951 | Ives | 251/50 |
| 2,577,967 | 12/1951 | Hughes | 251/61.2 |
| 2,651,325 | 9/1953 | Lusignan | 251/48 |
| 3,048,361 | 8/1962 | Francis | 251/61.2 |
| 3,083,943 | 4/1963 | Stewart, Jr. et al. | 251/61.1 |
| 3,100,002 | 8/1963 | Moore | 251/25 |
| 3,312,314 | 4/1967 | Peters | 251/335 B |
| 3,451,423 | 6/1969 | Priese | 137/556 |
| 3,482,267 | 12/1969 | Liljendahl | 251/61.1 |
| 3,719,343 | 3/1973 | Werra | 251/61.1 |
| 3,838,707 | 10/1974 | Wachowitz, Jr. | 251/335 A |

FOREIGN PATENT DOCUMENTS 1947396  3/1971  Fed. Rep. of Germany.
2455551  5/1976  Fed. Rep. of Germany.

Primary Examiner—George L. Walton
Attorney, Agent, or Firm—Larson and Taylor

[57] ABSTRACT

A diaphragm-type check valve for vacuum pipes is provided which enables opening of the valve using substantially less operating force than is required in conventional valves of the same size and type. The valve includes a flexible diaphragm which is disposed in the pipe and is held in its closed position by the vacuum in the pipe. A mechanical operator such as a vacuum-actuated piston causes opening of the valve. A cavity located on the side of the diaphragm opposite that which is exposed to the pipe vacuum is selectively connected to a source of suction or vacuum (preferably that provided by the pipe itself) so as to substantially equalize the pressure on both sides of the diaphragm and thereby enable opening of the valve with a less bulky operating mechanism that provides only the reduced operating force referred to above.

10 Claims, 1 Drawing Figure

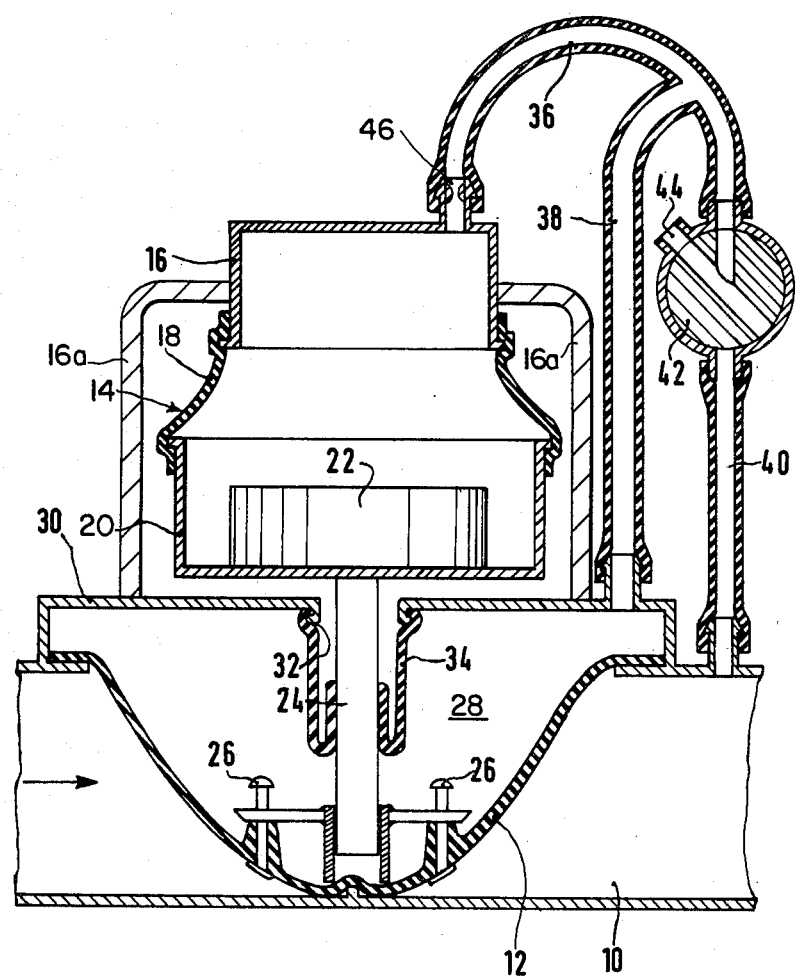

VACUUM OPERATED CHECK VALVE FOR VACUUM CONDUITS

FIELD OF THE INVENTION

The present invention relates to an improved diaphragm check valve for vacuum conduits of the type comprising a flexible diaphragm which is moved into the closed position by the vacuum in the conduit and into the open position by means of an operating mechanism connected to the diaphragm.

BACKGROUND OF THE INVENTION

A check valve of the type referred to above is described in German Pat. No. 1,609,245, and can be utilized in such devices as vacuum waste water conduits. In such prior art valves, the drive force of the opening mechanism must be relatively powerful in order to overcome the constant, oppositely acting force on the diaphragm provided by the vacuum in the line or conduit. Thus, if the drive mechanism is a cylinder-piston unit adapted to be connected to vacuum to provide the opening force, the surface area of the piston must necessarily be larger than the effective surface area of the diaphragm. Thus, such valve units are large and bulky in relation to the cross section of the conduit.

Two patents of possible interest were cited against the German application on which this application is based, viz., U.S. Pat. No. 3,451,423 and German Offenlengungsschrift No. 1,947,396. The former discloses two coaxially interconnected pistons, one of which mechanically engages a valve diaphragm. The latter discloses a valve diaphragm which is acted upon directly by a pressure medium.

SUMMARY OF THE INVENTION

Generally speaking, the invention is concerned with the problem of producing a check valve of the type specified wherein the operating or drive mechanism need only provide a relatively weak operating force and hence can be correspondingly small in size. In brief, the invention provides for utilizing a cavity or recess on the side of the diaphragm opposite to that exposed to the pipe vacuum which is selectively supplied with suction or vacuum so as to reduce the pressure across the diaphragm and thereby decrease the operating force required to open the valve. Stated differently, the invention, by providing for opening of the valve by vacuum or suction applied to the cavity, enables the effect of the pipe vacuum on the diaphragm to be wholly or partly counterbalanced so that only a slight additional force need be exerted by the operating mechanism to overcome the existing frictional and deformation forces (as well as any gravitational or spring biasing forces in the direction of closure) and thereby to move the diaphragm into the open position. Thus, in valves of this type wherein the operating mechanism is a control piston acted on by suction or vacuum forces, the piston can have a substantially smaller diameter than heretofore. In addition, the mounting and retaining devices for the piston cylinder can be of corresponding small dimensions.

Because the additional opening force that is to be applied by the operating mechanism in the check valve of the invention is largely independent of the size of the diaphragm, the same operating mechanism can be used for check valves with conduits of different sized cross sections. It will be appreciated that substantial advantages with respect to production and stock inventories accrue from such standardization of the operating mechanism.

A further advantage of the valve of the invention results from the fact that the valve can open more rapidly because of the comparatively greater operating force that can be produced by the simplified operating mechanism, thus avoiding the danger of having solids in the waste water clog the valve.

The invention is basically independent of the form of the diaphragm and the seat cooperating therewith, as well as independent of the type of operating mechanism and whatever biasing arrangement in the direction of closure is provided. For practical reasons, a piston, such as a vacuum operated diaphragm piston, is preferably utilized as the operating mechanism because a vacuum is available from the conduit itself right at the location of the valve. Thus, only a branch line is needed in order to simultaneously provide the suction forces for both the cavity and the drive piston of the operating mechanism. In such an embodiment a vacuum control line or conduit is connected to the waste water conduit downstream of the valve and to the cavity and the drive piston cylinder. This control line preferably includes a suitable additional control means provided for a specific purpose, e.g., a manual valve or an automatic control valve that responds to the limiting level of a liquid reservoir that is to be sucked off through the valve, such as is described for example in German OS No. 2,455,551. Moreover, a delay in the closing movement of the valve may be provided so as to, for example, admit a specific volume of air into the waste water conduit after the liquid is drawn off. This can be achieved by means of an adjustable choke in the control conduit which is operated when the check valve is closed.

In a preferred embodiment of the check valve of the invention, the connecting rod between the piston and the diaphragm passes through the wall of outer cavity or recess to which a vacuum is selectively applied and consequently a seal is disposed between the rod and this wall of the cavity. Advantageously, a diaphragm seal is used. While it is true that such a seal reduces the force acting in the direction of opening in proportion to the size of the check valve diaphragm, such diaphragm seals, as opposed to sliding seals, afford the advantage of being less likely to malfunction.

In accordance with a very important feature of the invention, the opening time of the valve is further reduced by retarding evacuation of the piston cylinder relative to the diaphragm cavity so that the piston, when put under vacuum, can be moved easily and quickly. Other features and advantages of the invention will be set forth in, or are apparent from, the detailed description of the preferred embodiments found hereinbelow.

BRIEF DESCRIPTION OF THE DRAWINGS

The single FIGURE in the drawings is a side elevational view, largely in cross section, of a check valve constructed in accordance with a preferred embodiment of the invention.

DESCRIPTION OF THE PREFERRED EMBODIMENT

Referring to the drawings, a vacuum pipe or conduit is indicated at 10. Conduit 10 is, for example, a waste water conduit which must normally be kept closed by a check valve at the external connections thereto, e.g., at the toilet bowls or a waste water collecting point. Such check valves are briefly opened by a special control mechanism so as to suck the waste water that has collected at the connection, as well as a specific amount of air, into the vacuum conduit. Diaphragm valves are advantageous for this purpose.

Such valves include a diaphragm, denoted 12 in the drawings, which is held securely in the closed position thereof by the vacuum in the line or conduit 10. In order to open the diaphragm valve, a driving force is employed which advantageously makes use of a vacuum in conduit 10. Similar to the diaphragm valve disclosed in German Pat. No. 1,609,245 referred to above, the valve illustrated in the drawings includes a vacuum operated cylinder-piston unit 14 comprising a fixedly mounted cylinder 16 and a piston 20 connected therewith by means of a flexible sleeve or diaphragm 18. Cylinder 16 is fixedly mounted by a pair of support members 16a, as illustrated. As is conventional, drive piston 20 can be biased by a weight 22 in the direction of closure. A spring (not shown) can also be used for this purpose. Drive piston 20 is fixedly connected to diaphragm 12 by a piston rod 24 and suitable fastening means such as the pin connectors indicated at 26.

As discussed above, in prior art systems drive pistons corresponding to piston 20 would supply all of the necessary force for moving the diaphragm 12 into the open position, and thus the piston would have to be relatively large. However, in the check valve of the invention drive piston 20 is comparatively much smaller than that normally utilized. According to the invention, a cavity 28 is provided which is tightly sealed from the ambient by an external wall 30, and which is selectively subjected to a vacuum or suction pressure. In this way, the suction force provided by the vacuum in conduit 10, and acting on diaphragm 12 in the direction of closure, is substantially balanced.

To prevent loss of vacuum in cavity 28, a seal is provided between wall 30 and piston 24. In the illustrated embodiment, a diaphragm seal 34 is used which attaches to a lip and wall 30 and which, in the application in question, should have the smallest possible surface area in order to keep frictional forces at a minimum. A lip seal (not shown) may also be used which would provide for a sliding contact with piston rod 24.

In the illustrated embodiment of the invention, a cylinder 16 and cavity 28 are connected through a pair of branch conduits 36, 38 to a common vacuum conduit 40 in which a control valve 42 is connected. Valve 42 includes a connection to ambient indicated at 44. In the position of the valve body illustrated, the valve 42 connects cylinder 16 and cavity 28 to connection 44, and thus to the ambient pressure. Under these circumstances, there is no connection between conduit 10 and cavity 28 or cylinder 16 and thus the vacuum in conduit 10 holds the check valve in the closed position illustrated. If the rotary valve body of control valve 42 is rotated clockwise about 45° in the example illustrated, cylinder 16 and cavity 28 will both be connected with the vacuum or suction pressure in conduit 10 by means of common control conduit 40 and thus piston 20 will act to open the valve.

It should be pointed out that cylinder 16 and cavity 28 do not necessarily have to be placed under vacuum simultaneously, or connected simultaneously with the ambient, as is provided for in the illustrated embodiment. For example, to speed up the valve opening operation, cavity 28 could be initially connected to vacuum conduit 10, whereby the overall check valve, because of biasing provided by weight 22 and other internal forces, would remain closed. If thereafter drive piston 20 is then put under vacuum, diaphragm 12 will be drawn very rapidly into the open position thereof. There are a number of ways in which this mode of operation can be implemented. For example, in the illustrated embodiment a simple restriction 46 is provided in the inlet port of cylinder 16. Alternately, a similar restriction could be provided in branch conduit 26. Further, a timing mechanism such as disclosed in copending U.S. application Ser. No. 784,844, filed on Apr. 5, 1977, and now abandoned in favor of Serial No. 958,433, could also be used for this purpose. It will be understood that it is not necessary that the pressure in cavity 28 be completely balanced before evacuation of cylinder 16 begins. It is sufficient that the evacuation of cylinder 16 be retarded with respect to the evacuation of cavity 28 so that diaphragm 12 can be drawn up quickly to rapidly open the valve when drive piston 20 is put under vacuum.

Although the invention has been described relative to exemplary embodiments thereof, it will be understood that other variations and modifications can be effected in these embodiments without departing from the scope and spirit of the invention.

I claim:

1. A diaphragm check valve for vacuum pipes or conduits comprising a diaphragm which is movable into a first position, wherein the valve is closed, by the suction pressure within the pipe in which the check valve is located and an operating mechanism connected to said diaphragm for moving said diaphragm to a second position wherein the valve is open, the improvement wherein a cavity is provided on the side of the diaphragm opposite to that which is exposed to the suction pressure within the pipe and means are provided for selectively supplying suction pressure to said cavity so as to balance the suction pressure on said diaphragm whereby said operating mechanism operates to move said diaphragm to said second position wherein said valve is open, said cavity and said operating mechanism being connectable to the suction pressure within said pipe and means being provided for retarding the application of suction pressure to said operating mechanism relative to said cavity so as to increase the operating speed of said operating mechanism.

2. A check valve as claimed in claim 1 wherein the operating mechanism comprises a piston which is movable responsive to said suction pressure, said piston being connected to said diaphragm by a connecting rod, said valve further comprising means for selectively communicating said piston with said suction pressure or the ambient pressure and for selectively communicating said cavity with said suction pressure or the ambient pressure.

3. A check valve as claimed in claim 2 wherein said cavity and said piston are simultaneously placed in communication with the suction pressure within said pipe, and the connection between said piston and said suction pressure includes a flow restriction therein for retarding the effect of said suction pressure on said piston.

4. A check valve as claimed in claim 1 wherein the outer wall of the said cavity is integral with the wall of the conduit in which said valve is located.

5. A check valve as claimed in claim 1 wherein said operating mechanism comprises a piston and cylinder unit, the cylinder unit being mounted on the outer wall of said cavity.

6. A check valve as claimed in claim 1 wherein said operating mechanism comprises a piston and cylinder unit, the cylinder being mounted on said wall of said conduit.

7. A check valve as claimed in claim 1 wherein said operating mechanism comprises a movable piston and a connecting rod extending into said cavity and connecting said piston to said diaphragm, and said check valve further comprises seal means, located in the outer wall of said cavity through which said connecting rod extends, for sealing said cavity.

8. A check valve as claimed in claim 1 wherein said seal means comprises a narrow diaphragm seal.

9. A check valve as claimed in claim 5 further comprising a connection between said piston and cylinder and said suction pressure.

10. A method of operating a check valve for vacuum pipes or conduits wherein the valve comprises a diaphragm which is movable into a first position wherein the valve is closed by the suction pressure within the pipe in which the check valve is located, and a piston and cylinder unit for moving the diaphragm into a second position wherein the valve is open, a cavity being provided on the side of the diaphragm opposite to that which is exposed to suction pressure with the pipe, said method comprising selectively supplying suction pressure from the pipe so as to at least partly balance the suction pressure on the diaphragm and thereafter applying suction pressure from the pipe to the cylinder of said piston and cylinder unit to cause said unit to rapidly move the diaphragm to the second position thereof thereby providing fast opening of the valve.

* * * * *